United States Patent [19]

Roberts et al.

[11] Patent Number: 4,976,112
[45] Date of Patent: Dec. 11, 1990

[54] COLD STORAGE CABINET USING LIQUIFIED GAS

[76] Inventors: Mason R. Roberts, 1250 Hidden Oaks Dr., Centerville, Ohio 45459; G. Robb Means, 305 N. Winter, Yellow Springs, Ohio 45387

[21] Appl. No.: 464,375

[22] Filed: Jan. 12, 1990

[51] Int. Cl.⁵ ............................................. F17C 7/04
[52] U.S. Cl. ................................. 62/48.1; 62/50.5; 62/52.1; 62/457.9
[58] Field of Search ................ 62/52.1, 457.9, 48.1, 62/50.5

[56] References Cited

U.S. PATENT DOCUMENTS

| | | | |
|---|---|---|---|
| 3,062,017 | 11/1962 | Balcar et al. | 62/48.1 |
| 3,166,913 | 1/1965 | Carter | 62/50.7 |
| 3,174,299 | 3/1965 | Ellis | 62/48.1 |
| 3,410,109 | 11/1968 | Maryland | 62/457.9 |
| 3,693,371 | 9/1972 | Clark | 62/222 |
| 3,714,793 | 2/1973 | Eigenbrod | 62/52.1 |
| 3,959,982 | 6/1976 | Denis et al. | 62/451.9 |
| 4,580,411 | 7/1986 | Orfitelli | 62/371 |
| 4,833,892 | 5/1989 | Wassibauer et al. | 62/51.1 |

Primary Examiner—Ronald C. Capossela
Attorney, Agent, or Firm—Jacox & Meckstroth

[57] ABSTRACT

A pushcart for frozen confectionaries includes a wheel supported insulated cabinet defining a food storage chamber having a rectangular top opening covered by three pivotally connected and removable lid sections. A stainless steel cryogenic tank is supported within the storage chamber under the center lid section and includes an inner wall surrounded by an outer wall to define a closed space therebetween. The inner tank wall defines a cryogenic chamber for receiving liquid nitrogen, and the space between the walls receives a predetermined partial vacuum or gas for precisely controlling the heat transfer from the storage chamber through the tank walls for absorption by the liquid nitrogen. Nitrogen vapor escapes from the tank chamber into the storage chamber through nozzles to maintain a low pressure within the tank, and the tank may be lifted and removed from the storage chamber after removing the lid sections for interchanging cryogenic tanks with different heat absorbing rates and to facilitate cleaning the inside walls of the cabinet.

19 Claims, 1 Drawing Sheet

U.S. Patent    Dec. 11, 1990    4,976,112
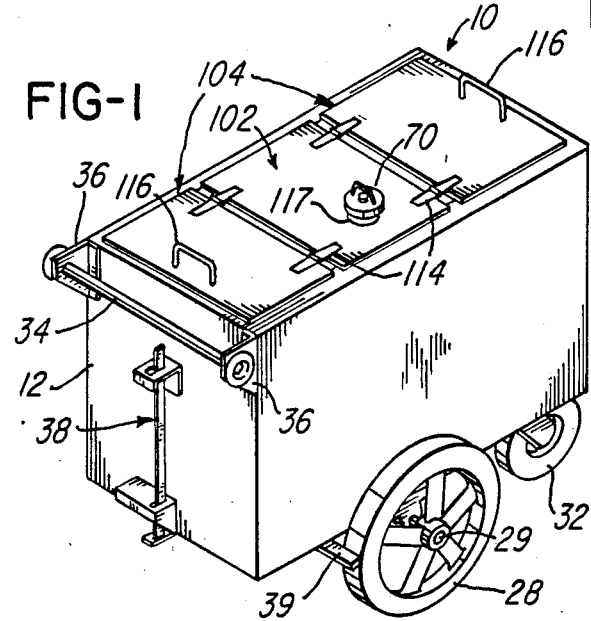
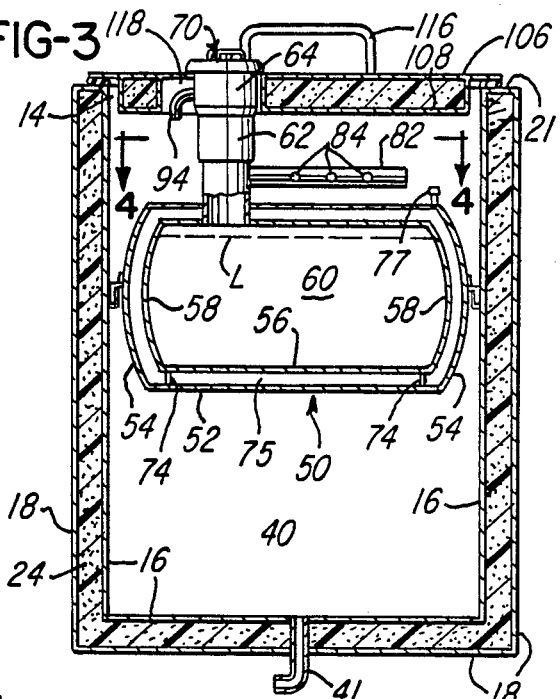
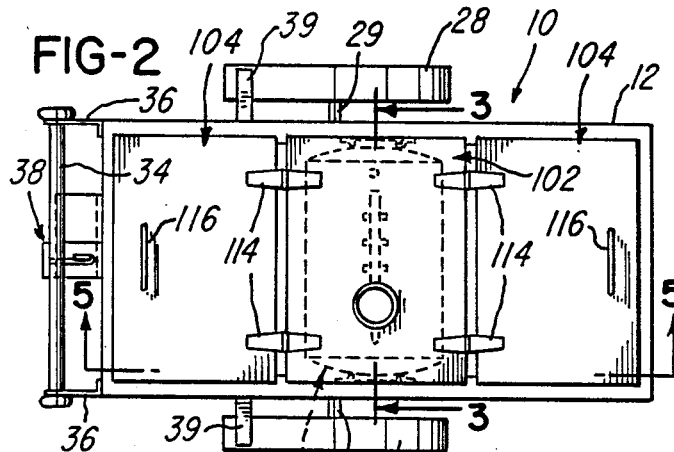
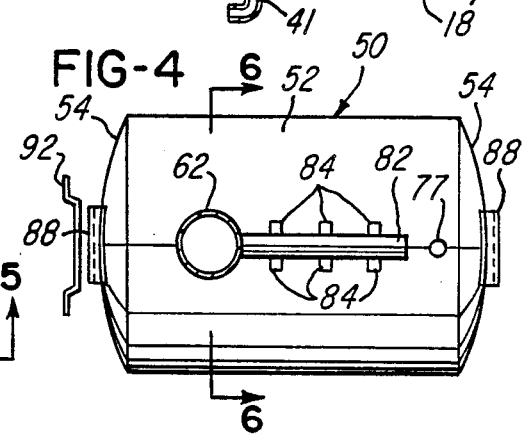
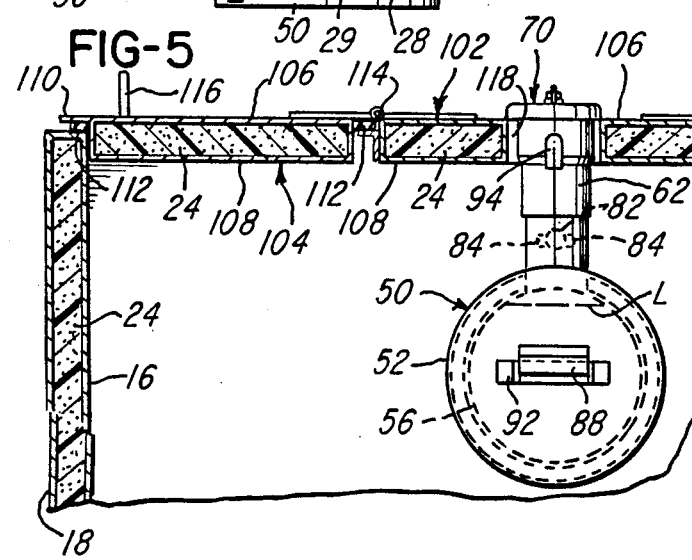
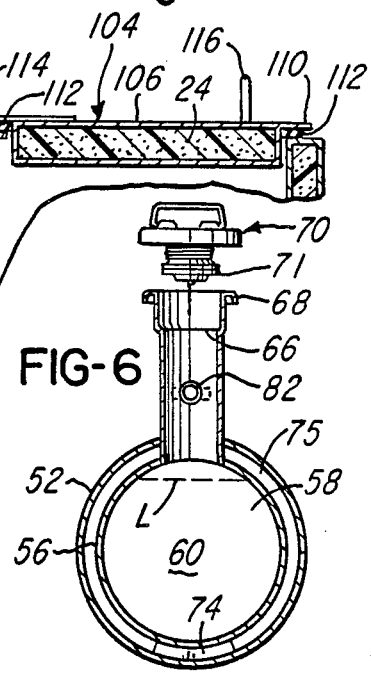

COLD STORAGE CABINET USING LIQUIFIED GAS

BACKGROUND OF THE INVENTION

In the construction of portable cold storage cabinets which use a source of liquified gas such as liquified nitrogen to obtain refrigeration, it is common for the liquified gas or nitrogen to be contained within a pressurized vessel and for the vapor to be supplied to a cold storage cabinet or chamber through a line having a valve controlled by a temperature sensing system. For example, U.S. Pat. Nos. 3,410,109, No. 3,693,371, No. 4,580,411 and No. 4,833,892 disclose different forms of cooling or freezing cabinets defining compartments which are refrigerated by means of a tank of liquified gas, usually liquified nitrogen which is commonly available. The vapor from the liquified nitrogen is directed from the upper portion of the supply tank to a perforated tube within the upper portion of the cooling or freezing chamber, and a thermostatic valve system controls the flow of vapor into the chamber according to the temperature desired within the chamber.

It has been determined that this form of refrigeration system is not very efficient since the nitrogen vapor quickly returns to the atmosphere without absorbing the maximum amount of heat per gallon of liquid nitrogen. In addition, the use of the temperature responsive control valve system and the pressure vessel for the liquified nitrogen add significantly to the cost of constructing, operating and servicing of the refrigeration system, thus making the liquified gas refrigeration system undesirable for many applications where refrigeration is obtained with solidified carbon dioxide or dry ice.

SUMMARY OF THE INVENTION

The present invention is directed to an improved and simplified liquified gas refrigeration system which is not only relatively inexpensive in construction and efficient, dependable and economical in operation, but also substantially eliminates the need for servicing the refrigeration system. As a result, the refrigeration system of the invention is ideally suited for portable and mobile cooling or freezer cabinets such as a wheel supported pushcart for vending ice cream and other frozen or refrigerated food products.

In accordance with one embodiment of the invention, an insulated box-like refrigeration cabinet encloses a double stainless steel wall cryogenic tank which receives liquified nitrogen through a fill tube extending upwardly through an insulated lid section. The inner and outer walls of the cryogenic tank define therebetween a space for receiving a partial vacuum or a predetermined supply of a gas selected to control the rate of heat transfer from the storage chamber through the tank walls for absorption by the liquified nitrogen. The vapor released by the liquified nitrogen as it absorbs heat through the tank walls is released from the tank chamber through a set of nozzles which return the vapor to the cabinet chamber so that the cryogenic tank maintains a low pressure and does not form a pressure vessel.

When the cooling or freezing cabinet is supported by a set of wheels to form a mobile pushcart, the cabinet has a rectangular top opening normally closed by three removable lid sections. The end lid sections are pivotally supported by the center lid section under which is located the liquified nitrogen tank supported by end hooks which releasably engage corresponding brackets mounted on the inner side walls of the cabinet. When the center lid section is removed with the end sections, the cryogenic tank may be lifted and removed from the cabinet chamber to permit convenient interchanging of cryogenic tanks having different heat absorption rates and to simplify cleaning of the inner walls of the cabinet.

Other features and advantages of the invention will be apparent from the following description, the accompanying drawing and the appended claims.

BRIEF DESCRIPTION OF THE DRAWING

FIG. 1 is a perspective view of a wheel supported mobile cold storage cabinet or pushcart constructed in accordance with the invention;

FIG. 2 is a plan view of the mobile cabinet or cart shown in FIG. 1;

FIG. 3 is a vertical section of the cabinet, taken generally along the line 3—3 of FIG. 2 and showing the internal cryogenic tank in section;

FIG. 4 is a larger plan view of the cryogenic tank shown in FIG. 3;

FIG. 5 is an enlarged fragmentary section taken generally on the line 5—5 of FIG. 2; and FIG. 6 is a section of the cryogenic tank, taken generally on the line 6—6 of FIG. 4.

DESCRIPTION OF THE PREFERRED EMBODIMENT

FIG. 1 illustrates a push-type ice cream vending cart 10 which includes a box-shaped metal container or cabinet 12 having a rectangular top opening 14 (FIG. 3). The cabinet 12 is preferably constructed of stainless steel sheet metal and includes inner side, bottom and end walls 16 and outer side, bottom and end walls 18 in corresponding spaced relation. The inner and outer walls are rigidly connected at the top by a frame-like top wall 21 which defines the opening 14, and a rigid insulation material 24 fills the space between the inner and outer walls. Preferably, the insulation material 24 is sold under the trademark RUBITEX and has a R Factor of 27 per inch of thickness.

The cabinet 12 is supported by a pair of rear wheels 28 mounted on a fixed axle 29 and a swivel or caster-type front wheel 32. A push bar 34 is attached to the rear of the cabinet 12 by a pair of brackets 36, and a manually actuated lever-type brake system 38 moves a bar 39 under the cabinet 12 for releasably engaging the rear wheels 28. As shown in FIG. 3, the inner walls 16 of the cabinet 12 define a rectangular box-like storage compartment or chamber 40, and an L-shaped drain tube 41 extends through the inner and outer bottom walls of the cabinet 12 for removing any liquid which collects on the inner bottom wall of the cabinet.

In accordance with the present invention, a cryogenic tank or tank unit 50 is positioned within the cabinet chamber 40 and is preferably fabricated entirely of stainless steel sheet metal. The tank unit 50 (FIG. 3) includes an outer cylindrical tank wall 52 welded to dome-shaped opposite end walls 54. The outer tank walls 52 and 54 surround an inner cylindrical tank wall 56 welded to opposite dome-shaped end walls 58, and the inner walls 56 and 58 define a tank chamber 60. A vertical stainless steel fill tube 62 extends through the outer tank wall 52 and is welded to the top of the inner tank wall 56 for supplying a predetermined volume of liquid gas or nitrogen to the tank chamber 60 until the liquid nitrogen has a predetermined level L. The fill tube 62 has an enlarged upper cylindrical portion 64 which extends from an annular shoulder 66 (FIG. 6) and has a downwardly turned outer skirt or lip portion 68. The upper portion 64 of the fill tube 62 is adapted to receive a standard pressure release cap 70. The cap 70 is constructed similar to a conventional automotive radiator cap and includes a spring biased annular seal 71 which seats on the shoulder 66 when the cap is rotated and secured to the lip 68. Preferably, the cap 70 is selected so that the resilient seal 71 automatically lifts from the seat 66 in response to a pressure of about 20 p.s.i. within the chamber 60. The cap 70 also incorporates a manual pressure relief button.

As shown in FIGS. 3 and 6, the inner cylindrical wall 56 of the tank unit 50 is supported within the outer tank wall 52 by a pair of arcuate stainless sheet metal ribs 74 which cooperate with the fill tube 62 to space the inner tank walls 56 and 58 within the corresponding outer tank walls 52 and 54 to define a chamber 75 extending completely around the inner tank walls 56 and 58 and having a substantially uniform width. The space or chamber 75 is partially evacuated or filled with a predetermined volume of a gas through a valve-type fitting 77 welded into the top end of the outer wall 52. A horizontal stainless steel vent tube 82 extends from the fill tube 62 and receives a set of six downwardly directed spray nozzles 84 each having a predetermined orifice with a diameter of about 0.024 inch. One form of spray nozzles 84, which has provided satisfactory results, is sold under the trademark FLOODJET, and each nozzle is threaded into the tube 82.

A Z-shaped support strap or hook 88 (FIG. 4) is mounted on each outer end wall 54 and includes a flange which projects downwardly into a hat-shaped support bracket 92 secured to the adjacent inner side wall 16 of the cabinet 12. When the tank unit 50 is lowered into the chamber 40, the sheet metal support hooks 88 extend downwardly into the brackets 92 for positioning and supporting the tank unit 50 within the center part of the storage chamber 40 at a predetermined distance above the bottom inner wall 16. As shown in FIG. 3, an L-shaped vent tube 94 connects with the fill tube 62 above the annular shoulder or seat 66 and projects downwardly into the chamber 40. The tube 94 directs any nitrogen vapor produced during filling of the tank unit 50 downwardly into the storage chamber 40.

The rectangular top opening 14 of the cabinet storage chamber 40 is covered or closed by a three lid sections including a center lid section 102 and a pair of opposite end lid sections 104. All of the lid sections 102 and 104 are preferably constructed of stainless steel and include a top outer wall 106 and box-shaped inner wall 108 confining an insulation material 24 between the walls. Each of the top walls 106 projects outwardly to form a peripheral lip or flange 110 which carries a peripherally extending resilient rubber-like seal 112. Each of the end lid sections 104 is pivotally supported by a pair of hinges 114 which connect the end lid section to the adjacent portion of the center lid section 102, as shown in FIGS. 1 and 2. A lift handle 116 is attached to each of the end lid sections 104 for pivoting the lid section to provide access to the cold storage chamber 40. As shown in FIGS. 3 and 5, the top wall 106 of the center lid section 102 has a circular hole 117 for receiving the fill tube 62, and the inner wall 108 of the center lid section 102 defines an opening 118 for receiving the cylindrical portion 64 of the fill tube 62 and the return vent tube 94.

To prepare the cold storage cabinet 12 for maintaining ice cream and other food products in a frozen state, the chamber 75 defined between the outer tank walls 52 and 54 and the inner tank walls 56 and 58 of the cryogenic tank 50 is first evacuated through the valve fitting 77. The chamber 75 is then either maintained with a partial vacuum or filled with a predetermined volume of gas, according to the temperature desired within the storage chamber 40. For example, when the chamber 75 is filled with air at atmospheric pressure of 14.7 p.s.i., the higher heat transfer produces a temperature in the storage chamber 40 at about minus 40° F. or greater. On the other hand, if the chamber 75 is evacuated and then filled with argon at atmospheric pressure, the temperature within the storage chamber 40 remains about minus 20° F. When the chamber 75 is evacuated to a pressure of minus 30 p.s.i., the temperature within the storage chamber 40 will remain about plus 20° F.

From the drawing and the above description, it is apparent a cold storage cabinet constructed in accordance with the present invention, provides desirable features and advantages. For example, the construction of the cryogenic tank 50 and its location within the cold storage chamber 40, provide for a simple, economical and dependable refrigerating system which eliminates the cost of control valves and temperature sensing control systems. Furthermore, by partially evacuating the chamber 75 or by filling the chamber with a selected gas, the heat transfer from the storage chamber 40 to the liquid nitrogen within the chamber 60, may be controlled according to the temperature desired within the storage chamber 40. While a small amount of nitrogen vapor escapes through the nozzles 84 into the storage chamber 40 to prevent a pressure buildup in the tank 50, the primary refrigeration or cooling is produced by heat transfer through the walls of the tank 50 and not by the release of nitrogen vapor through the nozzles 84 as the liquid nitrogen absorbs heat. As mentioned above, the release of the nitrogen vapors through the nozzles 84 produces a small amount of cooling. However, this form of cooling is not efficient since the cold nitrogen gas returns to the atmosphere without maximum heat absorption.

It has been found that the tank assembly 50 provides for cooling the storage chamber 40 with liquid nitrogen at maximum efficiency. As a result, the refrigeration produced by the tank 50 of liquid nitrogen, is significantly less expensive than the cost of refrigerating with solid carbon dioxide or dry ice. For example, it has been determined that the chamber 40 of the pushcart 10 may be refrigerated by the tank 50 at a cost of liquid nitrogen of about two dollars for twenty-four hours. This compares with a cost of at least fifteen dollars for dry ice to refrigerate the chamber 40 at the same temperature for twenty-four hours.

Another feature of the invention is provided by the support of the tank assembly 50 within the chamber 40 of the cabinet 12 and the construction of the removable cover or lid sections 102 and 104. That is, by simply lifting upwardly on the lid sections 102 and 104, the lid sections may be removed from the top opening 14. The cryogenic tank 50 may then be lifted from the storage chamber 40 so that the tank 50 may be interchanged with another tank 50 having a different heat absorption rate due to a different gas within the chamber 75. This convenient removal and interchangeability of the tank 50 enables the cart or cabinet 12 to be used for refrigerating food products at different selected temperatures. When the lid sections 102 and 104 of the tank assembly 50 are removed from the cabinet 12, the inner walls 16 of the cabinet may also be easily and conveniently cleaned.

While the form of refrigeration apparatus herein described constitutes a preferred embodiment of the invention, it is to be understood that the invention is not limited to this precise form of apparatus, and that changes may be made therein without departing from the scope and spirit of the invention as defined in the appended claims.

The invention having thus been described, the following is claimed:

1. A cold storage cabinet adapted to be transported and to maintain food products in a refrigerated state, comprising an insulated container defining a storage chamber having an access opening for receiving products to be cooled, door means mounted on said container for normally closing said opening and being movable to provide for access to said storage chamber, a tank disposed within said storage chamber and having insulated walls defining an enclosed tank chamber, inlet means extending into said tank for introducing a supply of liquified gas into said tank chamber, means for venting vapor from said tank chamber into said storage chamber, and means for controlling the heat transfer from said storage chamber through said insulated walls of said tank for absorption by the liquified gas within said tank chamber for controlling the temperature within said storage chamber.

2. A cold storage cabinet as defined in claim 1 wherein said walls of said tank include inner walls and surrounding outer walls defining an enclosed space therebetween, and said means for controlling the heat transfer comprise a predetermined volume of gas within said enclosed space.

3. A cold storage cabinet as defined in claim 2 wherein said inner and outer walls of said tank include generally cylindrical walls connected by circular corresponding end walls.

4. A cold storage cabinet as defined in claim 1 wherein said means for venting vapor comprise a tube connected to an upper portion of said tank, and a plurality of vapor release nozzles connected to said tube.

5. A cold storage cabinet as defined in claim 1 wherein said inlet means comprise a liquified gas fill tube connected to an upper portion of said tank, a pressure release cap releasably connected to said fill tube, and a conduit for returning vapor from said fill tube to said storage chamber when said cap releases.

6. A cold storage cabinet as defined in claim 1 wherein said container has a top said opening, said door means comprise at least one lid section, means for removably supporting said tank under said one lid section, and said one lid section being removable from said top opening to facilitate installing and removing said tank.

7. A cold storage cabinet as defined in claim 1 wherein said container has a rectangular top opening, said door means comprise a center lid section disposed between and pivotally supporting two end lid sections, means for removably supporting said tank under said center lid section, and all of said lid sections being removable from said container to facilitate installing and removing said tank and to facilitate cleaning of said storage chamber.

8. A cold storage cabinet as defined in claim 1 wherein said tank includes opposite walls supporting a pair of outwardly projecting hook members, and a corresponding pair of support brackets mounted on opposite walls of said container within said storage chamber for receiving said hook members.

9. A cold storage cabinet as defined in claim 8 wherein said container has a top said access opening above said tank, and said door means include a removable lid member covering said top opening to provide for conveniently installing and removing said tank within said storage chamber.

10. A cold storage cabinet adapted to be transported and to maintain food products in a refrigerated state, comprising an insulated container defining a storage chamber having a top opening for receiving products to be cooled, lid means mounted on said container for normally closing said opening and being movable to provide for access to said storage chamber, a tank disposed within said storage chamber and having inner walls defining an enclosed tank chamber, said tank also having outer walls surrounding said inner walls and spaced therefrom to define an enclosed spaced therebetween, inlet means extending through said inner and outer walls of said tank for introducing a supply of liquid nitrogen into said tank chamber, means for venting nitrogen vapor from said tank chamber into said storage chamber, and means for filling said enclosed spaced with a selected insulation media for controlling the heat transfer from said storage chamber through said inner and outer walls of said tank for absorption by the liquid nitrogen within said tank chamber to control the temperature within said storage chamber.

11. A cold storage cabinet as defined in claim 10 and including pressure release means for preventing nitrogen vapor within said tank chamber to exceed a predetermined low pressure.

12. A cold storage cabinet as defined in claim 10 wherein said means for venting nitrogen vapor comprise a tube connected to an upper portion of said tank, and a plurality of nitrogen vapor release nozzles connected to said tube.

13. A cold storage cabinet as defined in claim 10 wherein said inlet means comprise a liquid nitrogen fill tube connected to said inner wall of said tank and projecting above said lid means, a pressure release cap releasably connected to said fill tube above said lid means, and a conduit for returning nitrogen vapor from said fill tube to said storage chamber when said cap releases.

14. A cold storage cabinet as defined in claim 10 wherein said container has a rectangular top opening, said lid means comprise a center lid section disposed between and pivotally supporting two end lid sections, means for removably supporting said tank under said center lid section, and all of said lid sections being removable from said container to facilitate installing and removing said tank and to facilitate cleaning of said storage chamber.

15. A cold storage cabinet as defined in claim 10 wherein said outer walls of said tank support a pair of outwardly projecting hook members, and a corresponding pair of support brackets mounted on opposite walls of said container within said storage chamber for receiving said hook members.

16. A cold storage cabinet as defined in claim 10 and including a set of wheels supporting said cabinet to provide for transporting the refrigerated food products.

17. A cold storage cabinet adapted to be transported and to maintain food products in a refrigerated state, comprising a box-like insulated container having a rectangular top opening and defining a storage chamber for receiving products to be cooled, lid means mounted on said container for normally closing said top opening, said lid means including a plurality of lid sections providing for access to said storage chamber, a tank disposed within said storage chamber and having insulated walls defining an enclosed tank chamber, inlet means extending into said tank for introducing a supply of liquid nitrogen into said tank chamber, means for venting nitrogen vapor from said tank chamber into said storage chamber, means for using the liquid nitrogen within said tank chamber for absorbing heat from said storage chamber and for controlling the temperature within said storage chamber, means for removably supporting said tank under said lid sections, and all of said lid sections being removable from said container to facilitate installing and removing said tank and to facilitate cleaning of said storage chamber.

18. A cold storage cabinet as defined in claim 17 and including a set of wheels supporting said cabinet to provide or transporting the refrigerated food products.

19. A cold storage cabinet adapted to be transported and to maintain food products in a refrigerated state, comprising an insulated container having a top opening and defining a storage chamber for receiving products to be cooled, movable lid means mounted on said container for normally closing said top opening, a set of wheels supporting said container to provide for transporting the refrigerated products, a tank disposed within said storage chamber and having insulated walls defining an enclosed tank chamber, inlet means extending into said tank for introducing a supply of liquid gas into said tank chamber, means for venting gas vapor from said tank camber and for preventing a substantial build-up of pressure within said tank chamber, means for using the liquid gas within said tank chamber for absorbing heat from said storage chamber through said insulated walls and for controlling the temperature within said storage chamber, means for removably supporting said tank within said storage chamber, and said tank being removable from said storage chamber through said top opening.

* * * * *